United States Patent Office 2,978,456
Patented Apr. 4, 1961

2,978,456

PYRIDINE KETONE DERIVATIVES OF CERTAIN AMINO GUANIDINES AND PROCESS

Stanley Birtwell, William Glynne Moss Jones, and Roy Frederick Maisey, Macclesfield, England, assignors to Imperial Chemical Industries Limited, London, England, a corporation of Great Britain No Drawing. Filed July 17, 1958, Ser. No. 749,059

Claims priority, application Great Britain Aug. 2, 1957

6 Claims. (Cl. 260—296)

This invention relates to new organic compounds and more particularly it relates to new guanidine compounds which possess therapeutic properties especially in the treatment of allergic and inflammatory conditions.

According to the invention we provide the guanidine compounds which, in one of their tautomeric forms, may be represented by the formula:

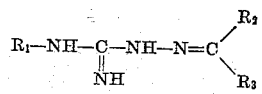

wherein $R_1$ stands for an aryl radical which may optionally be substituted, $R_2$ stands for a nitrogen-containing heterocyclic radical which may optionally be substituted and $R_3$ stands for an alkyl radical and the non-toxic pharmaceutically-acceptable salts thereof.

As suitable aryl radicals there may be mentioned in particular a phenyl radical, and optional substituents in the said radical may be for example a halogen atom for example a chlorine atom, or an alkyl radical for example a methyl radical. Suitable alkyl substituents ($R_3$) may be for example methyl or ethyl radicals. The nitrogen-containing heterocyclic radical may be for example a pyridyl radical linked in the 2-, 3- or 4-position and the said pyridyl radical may be in the form of its N-oxide. A preferred class of compounds is that wherein the substituent ($R_1$) stands for a phenyl radical optionally substituted by methyl radicals, the substituent ($R_2$) stands for a 3-pyridyl or a 4-pyridyl radical and the substituent ($R_3$) stands for a methyl radical. Particularly valuable compounds of the above stated formula are N-phenyl-N'-α-3-pyridylethylideneaminoguanidine, N-p-tolyl-N'-α-3-pyridylethylideneaminoguanidine, N-2:4-dimethylphenyl-N'-3-pyridylethylideneaminoguanidine, N-p-tolyl-N'-α-4-pyridylethylideneaminoguanidine and N-2:4-dimethylphenyl-N'-α-4-pyridylethylideneaminoguanidine and the corresponding hydrochlorides thereof.

According to a further feature of the invention we provide a process for the manufacture of the said guanidine compounds which comprises interaction of an aminoguanidine of the formula:

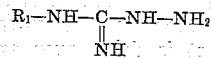

wherein $R_1$ has the meaning stated above, with a carbonyl compound of the formula:

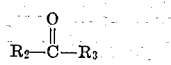

wherein $R_2$ and $R_3$ have the meaning stated above.

In the said process, the aminoguanidine may advantageously be used in the form of a salt thereof for example the hydrochloride, hydrobromide or hydriodide and the carbonyl compound may, if desired, be used in the form of a functional derivative thereof for example in the form of its bisulphite compound, acetal or cyclic acetal.

The reaction may also conveniently be carried out in the presence of an inert solvent or diluent for example water, lower aliphatic alcohols for example methanol, ethanol or butanol or aqueous alcoholic media and the reaction may be accelerated or completed by the application of heat.

As stated above, the new guanidine compounds possess useful therapeutic properties especially in the treatment of allergic and inflammatory conditions. They may thus be used as the active ingredient in the formulation of pharmaceutical compositions for example in the form of tablets, solutions or creams.

Thus according to a further feature of the invention we provide new pharmaceutical compositions wherein the active ingredient is at least one guanidine compound of the formula:

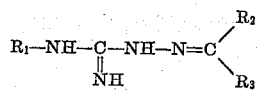

wherein $R_1$, $R_2$ and $R_3$ have the meaning stated above or a salt thereof.

As suitable salts of the said guanidine compounds there may be mentioned for example mineral acid salts for example the hydrochlorides and common organic acid salts for example the acetates.

The said pharmaceutical compositions may be in the form of tablets wherein the active ingredient is admixed with pharmaceutical excipients known to be suitable in the manufacture of such tablets. Suitable pharmaceutical excipients may be for example inert diluents for example calcium carbonate, disintegrating agents for example maize-starch, binding agents for example alginic acid and lubricating agents for example magnesium stearate. The said tablets may be uncoated or they may be coated to withstand disintegration in the presence of gastric juice.

The said tablet compositions may be formulated so that for every 100 parts by weight of the composition there is present between 25 parts by weight and 90 parts by weight of the appropriate guanidine compound or a salt thereof for example between 50 and 75 parts by weight of the said guanidine compound or a salt thereof.

The pharmaceutical compositions may be in the form of powders which are suitable for the extemporaneous preparation of aqueous solutions for injection or for topical use. They may advantageously contain a bacteriostatic agent for example a quaternary ammonium salt for example a mixture of alkyl trimethyl ammonium bromides known as Cetrimide B.P. and a diluent for example sodium chloride to provide isotonic solutions by addition of water.

The pharmaceutical compositions may furthermore be in the form of creams, ointments or pastes for topical use wherein the active ingredient is admixed with pharmaceutical excipients known to be suitable in the manufacture of such creams, ointments or pastes. The said creams are in the form of oil-in-water or water-in-oil emulsions in which the active ingredient is in suspension or dissolved in the oil phase. Suitable pharmaceutical excipients may be for example suitable mixtures of oily or fatty bases for example petroleum hydrocarbons for example liquid paraffin, vegetable fats for example arachis oil, long chain aliphatic alcohols and acids for example cetyl alcohol and stearic acid emulsifying agents for example condensation products of ethylene oxide with long chain aliphatic alcohols for example heptadecaethyleneoxycetanol and humectants for example polyhydric alcohols for example glycerol. Such cream compositions may be formulated so that for every 100 parts by weight of the composition there is present between about 0.1 parts by weight and about 10 parts by weight of the appropriate guanidine compound or a salt thereof for example about 2 parts by weight of the said guanidine compound or a salt thereof. The said ointments or pastes are such that the active ingredient or ingredients are dissolved in or dispersed in an anhydrous fatty base for example animal or vegetable fats or a paraffin base. The creams, ointments or pastes may also optionally contain a suitable preservative and/or a suitable anti-oxidant.

The pharmaceutical compositions may also be in the form of aqueous suspensions in which the active ingredient is a substantially water-insoluble salt for example a salicylate and is suspended in an aqueous base containing a dispersing agent and a suspending agent. Suitable dispersing agents may be for example acetyl alcohol polyethylene oxide condensation product, a naturally occurring phosphatide for example soya bean lecithin or a partial ester derived from the common fatty acids for example lauric, palmitic, stearic and oleic acid and hexitol anhydrides for example hexitans and hexides derived from sorbitol for example sorbitan mono-oleate and the corresponding condensation products of the said partial esters with ethylene oxide for example polyoxyethylene sorbitan mono-oleate. Suitable suspending agents may be sodium alginate or sodium carboxymethyl cellulose. Such aqueous suspensions may also contain preservatives and, if for oral use, in addition sweetening agents and flavouring agents.

The pharmaceutical compositions may also be in the form of dispersible granules and powders, wherein the active agent is mixed with a dispersing agent, as defined above, a suspending agent and suitable preservatives. Such dispersible granules are used for the preparation of injectable suspensions or they may be used, when admixed with sweetening agents for example sucrose and also flavouring and colouring agents, for oral administration.

The pharmaceutical compositions may furthermore be in the form of oily suspensions in which the active ingredient is suspended in oil for example sesame oil or arachis oil which contains a suitable preservative and anti-oxidant. For injection purposes, the oily suspension may optionally contain a protective colloid for example an aluminum salt of a long chain fatty acid for example aluminum stearate. For oral use, the oily suspensions preferably contain sweetening and flavouring agents for example sucrose and caramel flavour.

The pharmaceutical compositions may also be in the form of suspensions in an emulsion base of a substantially water insoluble salt for example the salicylate. Such oral emulsions are preferably of the oil-in-water type and suitable emulsifying agents may be those agents as hereinafter described.

The pharmaceutical compositions may also be in the form of oily solutions in which a suitable salt of the active ingredient for example the oleate is dissolved in an oily base for example arachis oil which may contain suitable preservatives and anti-oxidants. Oily solutions for oral use may be filled into suitable soft gelatin capsules.

The invention is illustrated but not limited by the following examples in which the parts are by weight:

*Example 1*

4.6 parts of N'-amino-N²-2:3-dimethylphenylguanidine hydriodide are added to a solution of 2 parts of 4-propionylpyridine in 40 parts of ethanol containing 1 drop of concentrated aqueous hydrochloric acid. The reaction mixture is heated under reflux during 2 hours and is then cooled and diluted with ether. There is thus obtained N-2:3-dimethylphenyl-N'-α-4-pyridylpropylideneaminoguanidine hydriodide as a crystalline product, M.P. 229–232° C.

*Example 2*

A mixture of 2.2 parts of N-p-chlorophenyl-N'-aminoguanidine hydrochloride, 1.2 parts of 3-acetylpyridine and 10 parts of 50% aqueous alcohol is heated under reflux for 20 minutes. The reaction mixture is cooled and made alkaline by the addition of a solution of sodium hydroxide in water. The mixture is then filtered and the solid residue is crystallised from aqueous alcohol. There is thus obtained N-p-chlorophenyl-N'-α-3-pyridylethylideneaminoguanidine, M.P. 184–185° C.

*Example 3*

The process described in Example 2 is repeated except that the 2.2 parts of N-p-chlorophenyl-N'-aminoguanidine hydrochloride used as starting material are replaced by 2.2 parts of N-phenyl-N'-aminoguanidine dihydrochloride. There is thus obtained N-phenyl-N'-α-3-pyridylethylideneaminoguanidine monohydrate, M.P. 81–83° C.

*Example 4*

The process described in Example 2 is repeated except that the 1.2 parts of 3-acetylpyridine used as starting material are replaced by 1.2 parts of 2-acetylpyridine. There is thus obtained N-p-chlorophenyl-N'-α-2-pyridylethylideneaminoguanidine, M.P. 119–122° C.

*Example 5*

A mixture of 3 parts of N-2:4-dimethylphenyl-N'-aminoguanidine hydriodide, 1.2 parts of 3-acetylpyridine and 10 parts of water is heated under reflux for 20 minutes. The solution is cooled and the resulting mixture is filtered. The solid residue is crystallised from alcohol. There is thus obtained N-2:4-dimethylphenyl-N' - α - 3 - pyridylethylideneaminoguanidine hydriodide, M.P. 242–244° C.

*Example 6*

The process described in Example 5 is repeated except that the 3 parts of N-2:4-dimethylphenyl-N'-aminoguanidine hydriodide used as starting material are replaced by 3 parts of N-m-tolyl-N'-aminoguanidine hydriodide. There is thus obtained N-m-tolyl-N'-α-3-pyridylethylideneaminoguanidine hydriodide, M.P. 228–230° C.

*Example 7*

The process described in Example 5 is repeated except that the 3 parts of N-2:4-dimethylphenyl-N'-aminoguanidine hydriodide and the 1.2 parts of 3-acetylpyridine used as starting material are replaced by 3 parts of N-2:3-dimethylphenyl-N'-aminoguanidine hydriodide and 1.2 parts of 4-acetylpyridine respectively. There is thus obtained N-2:3-dimethylphenyl-N'-α-4-pyridylethylideneaminoguanidine hydriodide, M.P. 231–232° C.

*Example 8*

A mixture of 2.2 parts of N-p-chlorophenyl-N'-aminoguanidine hydrochloride, 1.2 parts of 4-acetylpyridine and 10 parts of water is heated under reflux for 20 minutes. The reaction mixture is cooled and made alkaline with an aqueous solution of sodium hydroxide and the mixture is then extracted with ether. The ethereal extract is dried over anhydrous sodium sulphate and is then treated with an ethereal solution of hydrogen chloride. The mixture is filtered and the solid residue is crystallised from alcohol. There is thus obtained N- p- chlorophenyl- N' -α- 4- pyridylethylideneaminoguanidine dihydrochloride, M.P. 269–271° C. with decomposition.

*Example 9*

The process described in Example 8 is repeated except that the 2.2 parts of N-p-chlorophenyl-N'-aminoguanidine hydrochloride used as starting material are replaced by 3 parts of N-2:4-dimethylphenyl-N'-aminoguanidine hydriodide. There is thus obtained N-2:4-dimethylphenyl-N'-α-4-pyridylethylideneaminoguanidine dihydrochloride, M.P. 252–253° C.

*Example 10*

The process described in Example 8 is repeated except that the 2.2 parts of N-p-chlorophenyl-N'-aminoguanidine hydrochloride and 1.2 parts of 4-acetylpyridine used as starting material are replaced by 3 parts of N-p-tolyl-N'-aminoguanidine hydrochloride and 1.8 parts of 3-acetylpyridine respectively. There is thus obtained N-p-tolyl-N'-(α-3-pyridyl) ethylideneaminoguanidine dihydrochloride, M.P. 258–260° C. N-p-tolyl-N'-(α-3-pyridyl) ethylideneaminoguanidine salicylate has M.P. 140–142° C.

*Example 11*

A mixture of 2 parts of N-p-tolyl-N'-aminoguanidine hydrochloride, 1.2 parts of 4-acetylpyridine and 10 parts of ethyl alcohol is heated under reflux for 20 minutes. The reaction mixture is cooled and diluted with a solution of hydrogen chloride in butanol. The resulting mixture is filtered and the solid residue is crystallised from alcohol. There is thus obtained N-p-tolyl-N'-α-4-pyridylethylideneaminoguanidine dihydrochloride, M.P. 260–261° C.

*Example 12*

The process described in Example 11 is repeated except that the 1.2 parts of 4-acetylpyridine used as starting material are replaced by 2 parts of 4-propionylpyridine. There is thus obtained N-p-tolyl-N'-α-4-pyridylpropylideneaminoguanidine dihydrochloride, M.P. 249–251° C.

*Example 13*

A mixture of 2.9 parts of N-p-tolyl-N'-aminoguanidine hydrochloride, 2 parts of 4-acetylpyridine-N-oxide, 6 parts of water and 3 parts of concentrated hydrochloric acid is heated under reflux for 2 minutes. The reaction mixture is cooled and filtered and the solid residue is crystallised from alcohol. There is thus obtained N-p-tolyl-N'-(α-4-pyridyl-N-oxide) ethylideneaminoguanidine dihyrochloride, M.P. 219–221° C. with decomposition.

*Example 14*

The process described in Example 13 is repeated except that 2.9 parts of N-p-tolyl-N'-aminoguanidine hydrochloride used as starting material are replaced by 3.2 parts of N-p-chlorophenyl-N'-aminoguanidine hydrochloride. There is thus obtained N-p-chlorophenyl-N'-(α-4-pyridyl-N-oxide) ethylideneaminoguanidine dihydrochloride, M.P. 216–217° C. with decomposition.

*Example 15*

The process described in Example 13 is repeated except that the 2.9 parts of N-p-tolyl-N'-aminoguanidine hydrochloride used as starting material are replaced by 3.1 parts of N-2:4-dimethylphenyl-N'-aminoguanidine hydrochloride. There is thus obtained N-2:4-dimethylphenyl-N'-(α-4-pyridyl-N-oxide) ethylideneaminoguanidine dihydrochloride, M.P. 243–244° C. with decomposition.

*Example 16*

A mixture of 250 parts of N-p-tolyl-N'-(α-4-pyridyl) ethylideneaminoguanidine dihydrochloride, 47 parts of maize starch, 25 parts of alginic acid and 3 parts of magnesium stearate is compressed. The compressed material is then broken up and passed through a 16-mesh screen. The granules thus obtained are compressed into tablets which are suitable for oral administration for therapeutic purposes.

*Example 17*

A mixture of 250 parts of N-p-tolyl-N'-(α-3-pyridyl)-ethylideneaminoguanidine dihydrochloride, 50 parts of maize starch, 22 parts of alginic acid and 3 parts of magnesium stearate is compressed. The compressed material is then broken up and passed through a 16-mesh screen. The granules thus obtained are compressed into tablets which are coated by tumbling in a tablet-coating pan with the simultaneous addition of a sufficient quantity of a solution of 1 part of cetyl alcohol, 1 part of stearic acid and 2 parts of shellac in 6 parts of ethyl alcohol. When the coated tablets have attained a suitable consistency they are dusted by the addition of the required amount of a mixture of 1 part of talc and 1 part of stearic acid. The procedure is repeated until the tablets conform to the appropriate disintegration time in artificial gastric and intestinal juices. The enteric coated tablets so obtained are finally coated with sugar which may optionally contain colouring materials. The tablets thus obtained are suitable for oral use for therapeutic purposes.

*Example 18*

15 parts of N-p-tolyl-N'-(α-3-pyridyl)ethylideneaminoguanidine dihydrochloride are pasted with 70 parts of liquid paraffin. The paste is added to 5000 parts of white soft paraffin at 45–50° C. The mixture is then stirred until cool. There is thus obtained an ointment suitable for topical administration for therapeutic purposes.

*Example 19*

100 parts of N-p-tolyl-N'-(α-3-pyridyl)ethylideneaminoguanidine dihydrochloride are mixed with 100 parts of calcium carbonate. The mixture is filled into hard gelatine capsules. There is thus obtained a pharmaceutical composition suitable for oral administration for therapeutic purposes.

*Example 20*

A mixture of 2 parts of aluminum stearate and 98 parts of arachis oil is heated slowly with stirring to 100° C. The temperature is maintained at 100° C. during 1 hour, when gelling is complete, and it is then raised to 150° C. and maintained thereat during a further 1 hour. The resulting gel is then cooled and 10 parts of sterile micropulverised N-p-tolyl-N' - (α - 4 - pyridyl)ethylideneaminoguanidine dihydrochloride are incorporated therein with stirring. There is thus obtained a suspension suitable for intramuscular injection for therapeutic purposes.

*Example 21*

To an intimate mixture of 1 part of sterile cetyl trimethyl ammonium chloride and 25 parts of sterile sodium chloride are added 100 parts of sterile N-p-tolyl-N'-(α-3-pyridyl)ethylideneaminoguanidine dihydrochloride. The mixture is stirred until homogeneous and there is thus obtained a powder suitable for filling into multidose containers which can be used for the extemporaneous preparation of sterile solutions for injection for therapeutic purposes.

*Example 22*

20 parts of coconut oil, 78 parts of arachis oil and 2 parts of beeswax are melted together by heating to 70–80° C. and 0.07 part of propyl gallate is added with stirring. Stirring is continued until solution is complete. 8 parts of N-p-tolyl-N'-(α-3-pyridyl)ethylideneaminoguanidine dihydrochloride, 40 parts of icing sugar and 0.6 part of saccharin sodium are mixed together in a conventional mixer and the oily solution is added thereto slowly with continuous stirring until a homogeneous product is obtained. A suitable flavouring agent is then added. There is obtained an oily suspension suitable for oral administration for therapeutic purposes.

*Example 23*

A solution is prepared by dissolving 1.5 parts of methyl p-hydroxybenzoate, 0.2 part of propyl p-hydroxybenzoate, 200 parts of sucrose, 5 parts of a refined soya bean lecithin and 8 parts of polyvinylpyrrolidene in 1000 parts of water. 300 parts of micropulverised N-p-tolyl-N'-α-3-pyridylethylideneaminoguanidine salicylate are added to the aqueous vehicle so obtained and the resulting mixture is ball-milled for 15 minutes. By the incorporation of a suitable flavouring material there is obtained a suspension suitable for oral use for therapeutic purposes.

*Example 24*

100 parts of sterile N-p-tolyl-N'-α-4-pyridylethylideneaminoguanidine hydrochloride are incorporated gradually in a conventional mixer with a mixture of 25 parts of sterile sodium chloride and 0.25 part of sterile Cetrimide B.P. The homogeneous mixture so obtained is filled into vials and there is thus obtained a powder suitable for the extemporaneous preparation of aqueous solutions for parenteral injection for therapeutic purposes.

What we claim is:

1. Guanidine compounds which, in one of their tautomeric forms, have the formula:

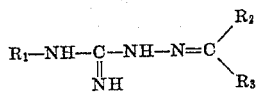

wherein $R_1$ stands for an aryl radical selected from the group consisting of phenyl, halophenyl, and lower alkylphenyl; $R_2$ is selected from the group consisting of pyridyl-(2), pyridyl-(3), pyridyl-(4) and their oxides and $R_3$ stands for a lower alkyl radical, and the non-toxic pharmaceutically-acceptable salts thereof.

2. Process for the manufacture of the guanidine compounds claimed in claim 1 which comprises reacting an aminoguanidine of the formula:

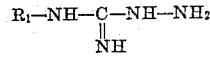

wherein $R_1$, has the meaning stated in claim 1, with a carbonyl compound of the formula:

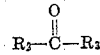

wherein $R_2$ and $R_3$ have the meaning stated in claim 1.

3. Process is claimed in claim 2 wherein the aminoguanidine is used in the form of a salt thereof selected from the group consisting of the hydrochloride, hydrobromide and hydriodide.

4. Process as claimed in claim 2 wherein there is present an inert liquid medium.

5. Process as claimed in claim 4 wherein the medium is selected from the group consisting of water, a lower aliphatic alcohol and mixtures thereof.

6. Process as claimed in claim 2 wherein the reaction is accelerated by the application of heat.

No references cited.